Aug. 8, 1950           I. WOLFF           2,517,752
RADIO NAVIGATION SYSTEM FOR AFFORDING SELECTIVE
DISPLAY OF TRAFFIC INFORMATION
Filed Oct. 31, 1945           2 Sheets-Sheet 1
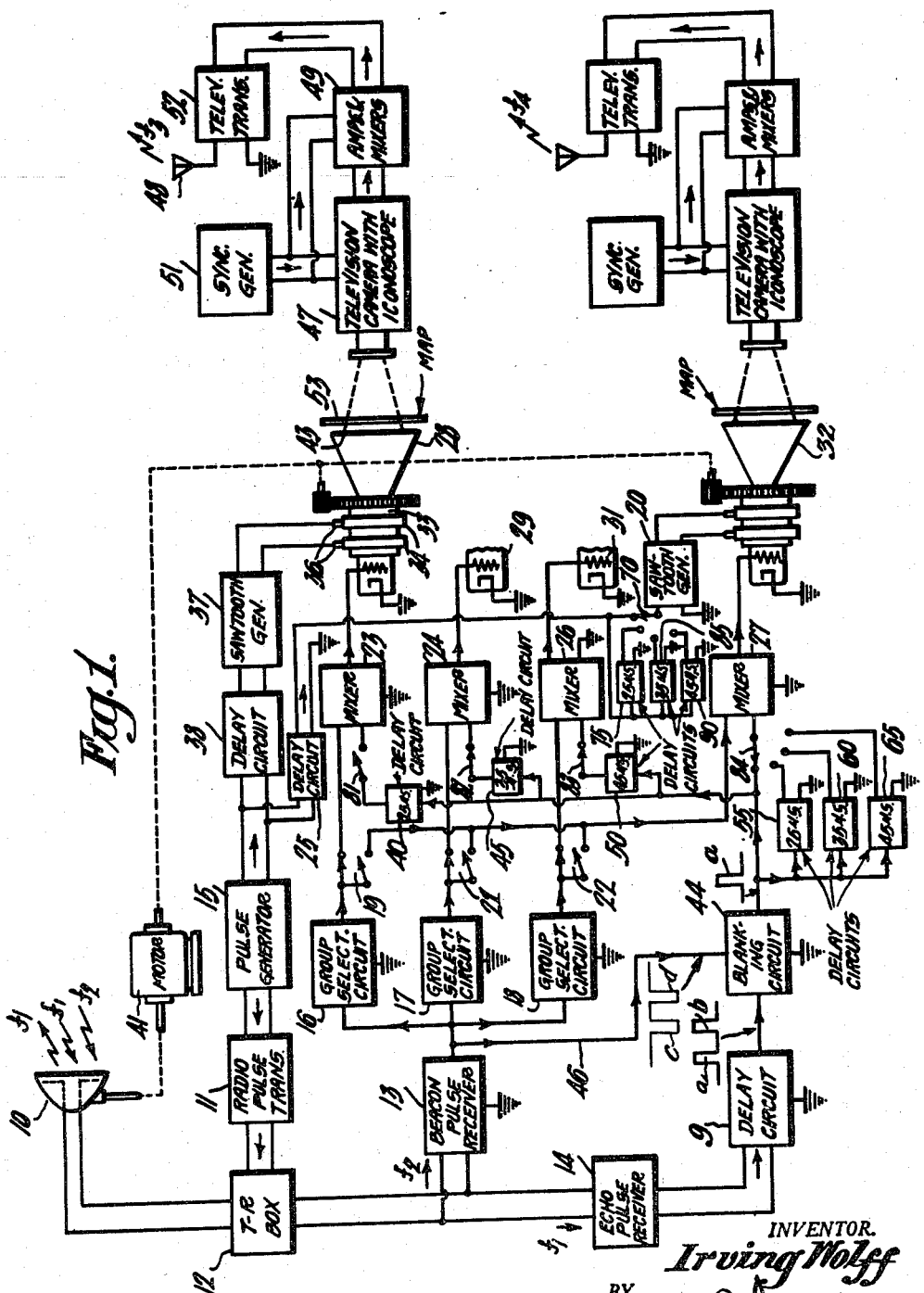
INVENTOR.
*Irving Wolff*
BY
ATTORNEY

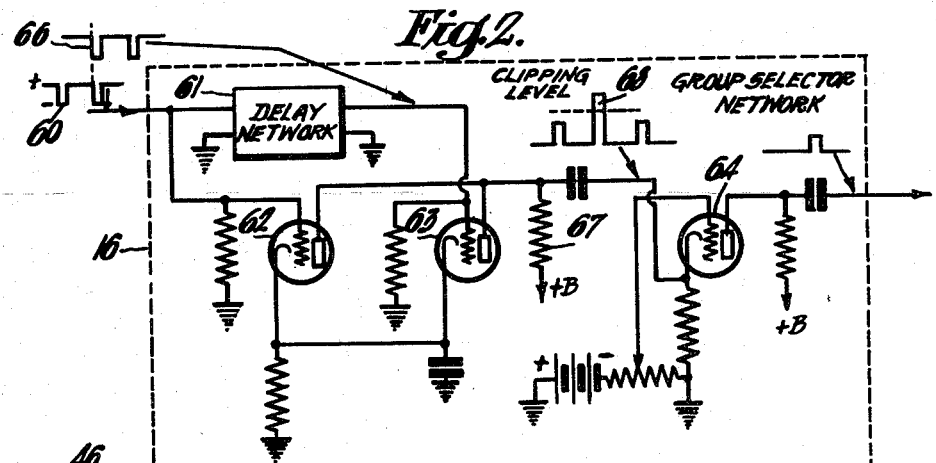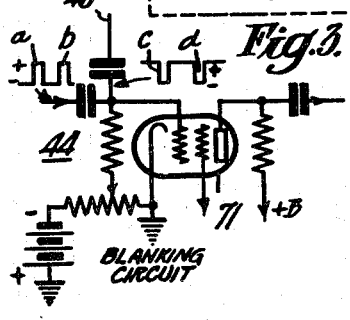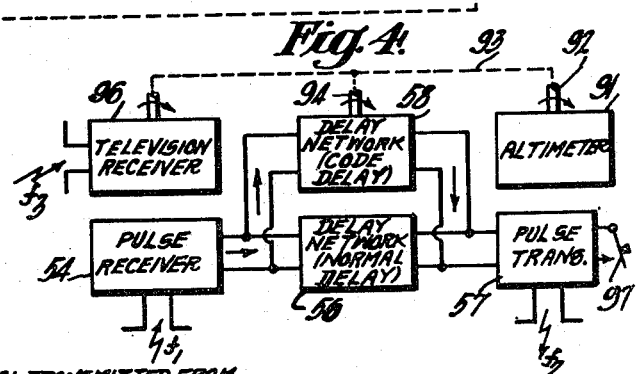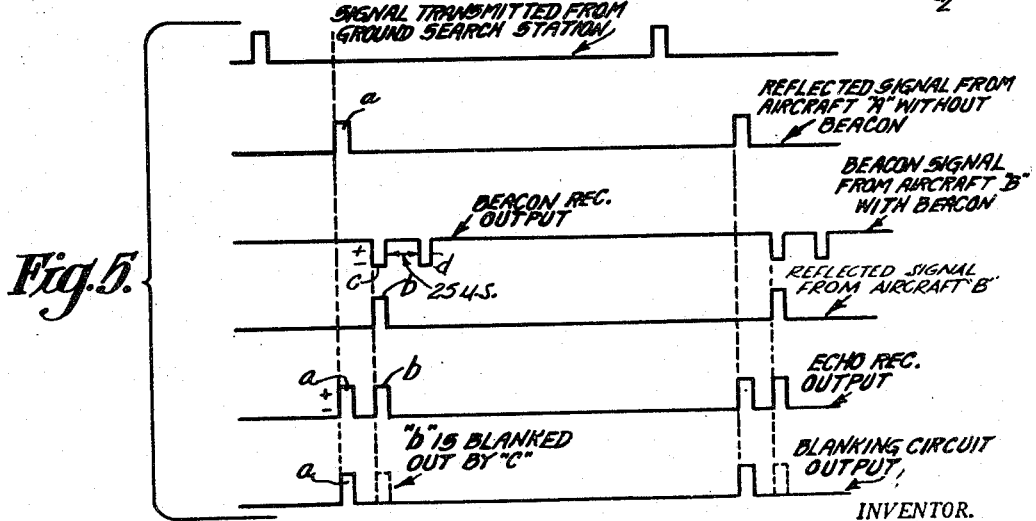

UNITED STATES PATENT OFFICE 2,517,752

RADIO NAVIGATION SYSTEM FOR AFFORDING SELECTIVE DISPLAY OF TRAFFIC INFORMATION

Irving Wolff, Princeton, N. J., assignor to Radio Corporation of America, a corporation of Delaware Application October 31, 1945, Serial No. 625,913

6 Claims. (Cl. 343—5)

My invention relates to radio navigation and traffic control systems and particularly to radar systems for ship or aircraft operations wherein the desired information is obtained either from reflected or echo signals or from signals transmitted by transponder beacons in response to interrogation by radar pulses.

The invention provides means for automatically discriminating between echo signals from ships or aircraft that carry transponder beacons and those that do not carry such beacons so that the responses from each group may be separately examined or utilized. The invention is particularly applicable, for example, to systems such as those described in the copending application Serial No. 607,999½, filed July 31, 1945 in the name of Loren F. Jones and entitled Radio Navigation System, and in the copending application Serial No. 618,969, filed September 27, 1945 in the name of Philip J. Herbst and entitled Radio Navigation System. In the Jones application there is described and claimed a navigation system for ships or aircraft which comprises a radar system such as a Plan Position Indicator system (P. P. I. system) on the ground and a television transmitter for transmitting the P. P. I. view of craft within the service area of the P. P. I. and television stations to said craft. Each ship or aircraft that is equipped to take full advantage of the system carries both a television receiver and a radar pulse repeater unit which is referred to as a radar beacon or transponder beacon.

In the invention described in the Herbst application, a system similar to that of Jones may be employed in which each aircraft carries a radar beacon or transponder beacon. Each transponder beacon transmits two pulses on a certain carrier frequency in response to interrogation by the ground search radar station transmitting pulses on a different carrier frequency, that is, in response to the reception of a pulse from the P. P. I. station. The two pulses thus transmitted are separated by a code time interval, a particular code interval being assigned to a certain group of aircraft. For example, the aircraft flying in a particular altitude layer such as from 0 to 2000 ft. may be assigned one code delay time while those in a different altitude layer such as from 2000 to 4000 ft. may be assigned a different code delay time. At the ground radar station all beacon pulses are received by a receiver tuned to the beacon transmitter frequency and suitable group selector circuits are provided for causing signals of a particular code delay to appear on a preassigned indicator tube screen. The echo pulses, i. e., the pulses reflected from the surface of the aircraft, are received at the ground station by a receiver that is tuned to the carrier frequency of the search radar transmitter.

In the systems described by Jones and Herbst, the reflection or echo pulses (as distinguished from the transmitted beacon pulses) all appear in the echo pulse receiver output at the ground station and are applied to the echo pulse indicator tube. Thus, the screen of this indicator tube has appearing on it representations of all aircraft in the service area whether they carry beacons or not. It may be desirable to obtain a view on one viewing screen of only those aircraft that do not carry beacons.

Accordingly, an object of the present invention is to provide in a radio navigation and/or traffic control system means for distinguishing between craft equipped with transponder beacons and those not so equipped.

A further object of the invention is to provide an improved radio navigation and/or traffic control system.

A further object of the invention is to provide in a radar system a means of separating the echo responses reflected from aircraft not equipped with transponder beacons from the echo responses reflected from aircraft that are so equipped.

A still further object of the invention is to provide a combined radar and television navigation system having improved means for transmitting to aircraft not equipped with transponder beacons a P. P. I. or other radar picture of only the aircraft that are not so equipped.

In practicing the present invention, the echo pulses appearing in the output of the echo pulse receiver at the ground station are supplied to a blanking circuit and pass therethrough to an indicator tube unless the blanking circuit is blocked. Also, the beacon pulses appearing in the output of the beacon pulse receiver at the ground station are supplied to the blanking circuit to block it for the duration of each of said beacon pulses. As a result only the echo pulses from craft that are not carrying beacons will pass through the blanking circuit to the indicator tube. This is because the echo pulse from a beacon equipped craft and the first beacon pulse therefrom are impressed upon the blanking circuit simultaneously whereby the first pulse of a pair of beacon pulses blocks the blanking circuit for the duration of the applied echo pulse.

The invention will be better understood from the following description taken in connection with the accompanying drawing in which Figure 1 is a block diagram illustrating one embodiment of the invention, Figure 2 is a circuit diagram of one of the group selector circuits shown in Fig. 1, Figure 3 is a circuit diagram of the blanking circuit shown in Fig. 1, Figure 4 is a block diagram of a system that may be carried by an aircraft which is to use the ground station of Fig. 1 for navigation, and Figure 5 is a group of graphs illustrating the operation of the system shown in Figs. 1 to 4.

In the several figures, similar parts and graphs are indicated by similar reference characters.

Referring to Fig. 1, the ground station comprises a radar system of the P. P. I. type which includes a rotatable directive antenna 10, a radio pulse transmitter 11 which is coupled to the antenna 10 through a transmit-receive or T-R box 12 that functions as an antenna duplexer as is well known in the art. The transmitter 11 is pulse modulated by electrical pulses supplied from a pulse generator 15. Reflected or retransmitted pulses are received by the antenna 10 and supplied through the T-R box 12 to a beacon pulse receiver 13 tuned to the carrier frequency $f_2$ and to an echo pulse receiver 14 tuned to the carrier frequency $f_1$. A plurality of group selector circuits 16, 17 and 18, which are described hereinafter, are supplied with signal from the receiver 13. The output pulses of the circuits 16, 17 and 18 may be supplied by way of switches 19, 21 and 22 through mixer circuits 23, 24, 26 and 27 to cathode ray indicator tubes 28, 29, 31 and 32.

The cathode ray indicator tubes may be of conventional design each having a control grid to which pulses from the mixer circuits are applied. The cathode ray of each indicator tube is deflected radially by means of a deflecting yoke, which is indicated at 33 for the tube 28, each yoke comprising a pair of deflecting coils that are provided with conductor rings 34 and brushes 36 whereby the yoke may be rotated during the radial deflection. A sawtooth deflecting wave is supplied to the deflecting yoke 33 from a sawtooth deflection circuit 37. A similar deflecting wave is supplied to the deflecting yokes (not shown) of the indicator tubes 29 and 31. The deflection circuit 37 is synchronized with the pulse transmission by means of pulses taken off the pulse generator 15 and supplied through a delay network 38 to the circuit 37. The delay network 38 is employed to delay the start of the cathode ray sweep at the tube 28. The amount of this delay depends on the coding delay assigned to the aircraft flying in a particular altitude layer and which are to be indicated on the cathode ray tube 28.

A motor 41 is mechanically coupled to the antenna 10 and to the yoke 33 for rotating them in synchronism at some slow rate such as one rotation every six seconds.

The cathode ray tube 28 is provided with a phosphorescent screen 43 having long persistence. Light spots appear on the screen 43, as in the usual P. P. I. picture, which corresponds to the aircraft that reflect or retransmit the radio pulses. A spot in the P. P. I. picture corresponds to an aircraft, the distance of the spot from the center of the picture showing the distance from the radar station to said aircraft, and the angular position of the spot showing the azimuth of the aircraft with respect to the radar station.

Because of the pulse delay introduced by an aircraft transponder beacon for preventing "singing" of the beacon, the echo pulses from the receiver 14 are delayed a corresponding amount by a delay circuit 9 so that there will be coincidence of the echo pulse and the first pulse of the pair of pulses transmitted by the beacon. Also, the start of the sawtooth deflecting wave supplied by a sawtooth generator 20 to the deflecting yoke of the tube 32 is preferably delayed a like amount by means of a delay circuit 25.

From the output of the delay circuit 9 the echo pulses are applied to a blanking circuit 44 which (when it is not blocked) supplies them to the mixer 27. The output of mixer 27 is applied to the indicator tube 32 upon the screen of which appear spots representing only the aircraft not carrying beacons. The blanking out of echo pulses (directed reflected pulses) from the aircraft that are carrying beacons is accomplished by applying to the blanking circuit 44 over a lead 46 the pulses appearing in the output of the beacon receiver 13. As explained hereinafter, the first pulse of the pair of pulses "c" and "d" transmitted from an aircraft beacon will block the blanking circuit 44 during the presence of the echo pulse "b" from the aircraft carrying said beacon. Before describing the blanking action in more detail, reference will be made to the other portions of the complete system.

Referring to the television transmitter portion of the system, the P. P. I. picture on the screen 43 is picked up by a television camera 47 of a conventional type including an Iconoscope or Orthicon and is transmitted from an antenna 48 which, in the present example, is non-directive. The television transmitting system is of conventional design and comprises, in addition to the television camera 47, suitable amplifiers and mixers indicated at 49, a synchronizing pulse generator 51 that supplies synchronizing signal to the horizontal and vertical deflecting circuits of the camera 47 and to the amplifiers and mixers 49, and a radio transmitter 52 that transmits a carrier wave modulated by the usual mixture of picture and synchronizing signals.

A map 53 of the territory surrounding the ground station preferably is superimposed on the P. P. I. picture and transmitted therewith. The map may be drawn on transparent material and suitably illustrated.

Similar television transmitters are provided for transmitting the views appearing on the screens of the indicator tubes 29, 31 and 32.

Referring now to the aircraft equipment, shown in Fig. 4, each aircraft is provided with a radar beacon, also referred to as a transponder beacon, that receives the ground station pulses on the carrier frequency $f_1$ and retransmits pulses on the carrier frequency $f_2$. Each aircraft is also provided with a television receiver 96 which normally is tuned to the carrier frequency ($f_3$ in the present example) assigned to the particular altitude layer in which the aircraft is flying whereby the combined view of the P. P. I picture of the tube 28 and the map 53 are received. The spots in the received picture correspond to the spots on the P. P. I. screen 43 which are representative of aircraft. Therefore, the pilot of an aircraft can see his location with respect to the airport and with respect to anything else shown on the map providing he can determine what spot in the P. P. I. picture corresponds to his own aircraft. Suitable means for obtaining such aircraft identification will be described hereinafter.

When the pilot desires he may tune the television receiver to the carrier frequency $f_4$ to receive a picture showing only the aircraft that are not equipped with beacons.

Referring to Fig. 4, the radar beacon carried by each aircraft comprises a radio pulse receiver 54 which receives and demodulates the radar pulses transmitted from the ground station on a carrier wave frequency $f_1$. The demodulated pulses may be sent through a delay line or network 56 and the resulting delayed pulses are applied as modulating pulses to a radio transmitter 57 operating on a carrier wave frequency $f_2$. The demodulated pulses are also applied by way of a branch circuit through a delay network 58 to obtain delayed pulses which are also applied as modulating pulses to the transmitter 57. As a result the two modulating pulses appear as a pair of pulses at the input of transmitter 57. Thus each pulse received at the beacon is retransmitted as a pair of pulses at the carrier frequency $f_2$. The delay introduced by the network 56 and the difference in the frequencies $f_1$ and $f_2$ are utilized to prevent "singing" of the beacon circuit. As will be explained hereinafter, the delay nework 56 may be omitted if desired. The delay introduced by the network 58 is utilized for coding purposes, a particular coding delay being assigned for each altitude layer. These altitude layers and the corresponding code delays may, for example, be as follows:

0 to 2000 ft.—25 μs. code delay.
2000 ft. to 4000 ft.—35 μs. code delay.
4000 ft. to 6000 ft.—45 μs. code delay.

Fig. 2 shows in detail one of the group selector circuits for decoding the retransmitted signals at the ground station. If an aircraft flying at an altitude of less than 2000 feet receives pulses from the ground station, the aircraft beacon transmits the pairs of pulses represented by graph 60 and having 25 μs. spacing in the example assumed. These pulses appear at the output of the receiver 13 (Fig. 1). It may be assumed for the purpose of illustration that each pulse is of 5 μs. duration.

The pairs of pulses 60 are applied from the receiver 13 to a decoding delay network 61 and to a vacuum tube 62 of a mixer-clipper circuit comprising the tube 62 and vacuum tubes 63 and 64. The pairs of delayed pulses 66 from the delay network 61 are applied to the vacuum tube 63. The pulses supplied to the tubes 62 and 63 add due to the common plate resistor 67 as indicated by the graph 68. The combined pulse is clipped off at a predetermined level by means of a clipper tube such as the tube 64 which is biased beyond plate current cut-off.

It will be noted that in graph 68 one pulse is of greater amplitude than the other since the decoding delay of 25 μs. has caused the first pulse of graph 66 to occur simultaneously with the second pulse of graph 60. Only the top portion of this high amplitude pulse is passed through the clipper tube 64 to the grid of the cathode-ray indicator tube 28 (Fig. 1), this being accomplished by adjusting the bias on the tube 64 to make it clip or limit at the level indicated by the dotted line marked "clipping level."

It will be apparent that the start of the radial deflection of the cathode ray in the tube 28 should be delayed by substantially the same amount that the pulse appearing on the grid of the tube 28 has been delayed by the coding delay network 61. Otherwise, the spot produced on the screen 43 by the pulse would not appear at the correct distance from the center of the screen to indicate the distance to the aircraft, or it might not appear on the screen at all. For this reason, the delay network 38 delays the sawtooth wave triggering pulse by an amount equal to the coding delay, which in this instance is 25 μs.

As previously stated, the view of aircraft in the 0 to 2000 ft. layer thus obtained on the screen 43 is televised to said aircraft on the carrier wave of frequency $f_3$. Since the television receivers on aircraft in other altitude layers are tuned to frequencies other than $f_3$ they will not receive the picture on screen 43.

If there is an aircraft in the 2000 to 4000 ft. layer, its beacon will transmit pairs of pulses with a code delay of 35 μs. in the present example. These pulses will produce no indication at the indicator tube 28 because the decoding network 61 delays them only 25 μs. so that no pulses are superimposed or added. Likewise, the pulses from the 0 to 2000 ft. layer will not affect the indicators 29 and 31 for the other altitude layers.

Fig. 3 shows, by way of example, the circuit details of the blanking circuit 44. It comprises a vacuum tube 71 that is biased to pass the positive polarity echo pulses such as pulses "a" and "b" so long as no negative pulses such as pulses "c" and "d" are being impressed upon the control grid (or upon a second grid not shown) of the tube 71.

The graphs in Fig. 5 illustrate the operation of the blanking circuit. The pulses "a" and "b" are the echo pulses reflected from the surfaces of two aircraft "A" and "B," respectively. The air of pulses "c" and "d" are the pulses transmitted by the transponder beacon in the aircraft "B." Both of the pulses "a" and "b" appear in the output of the echo receiver 14 as indicated. The time relations of the several graphs are for the pulses as they appear at the blanking circuit 44. A comparison of the graphs shows that the pulses "c" and "b" from the beacon carrying craft B are impressed upon the blanking circuit 44 simultaneously whereby the echo pulse "b" is prevented from passing through the blanking circuit. The same action takes place for all echo signals from beacon-carrying aircraft. Thus, the only aircraft shown on the screen of the indicator tube 32 are those that do not carry beacons, unless signal from some other source than the blanking circuit 44 is applied to the mixer 27.

The purpose of the mixers 23, 24, 26 and 27, the switches 19, 21, 22 and the switches 81, 82, 83 and 84 is to mix or superimpose a plurality of groups of indications on one indicator tube screen if desired. With the switches in the positions shown, the indicator tube 28 shows only the aircraft in the 0 to 2000 ft. layer that carry beacons; the indicator tubes 29 and 31 show the aircraft in the 2000 to 4000 ft. and 4000 to 6000 ft. layers, respectively, that carry beacons and also shows all aircraft, regardless of their altitude, that do not carry beacons; and the indicator tube 32 shows only the aircraft that are not carrying beacons.

When the echo pulses are fed into the mixer 23, 24 or 26, they must be delayed the same amount as the beacon pulses supplied from the corresponding selector circuit 16, 17 or 18. This also is the same amount the start of the sawtooth deflecting voltage for the cathode ray tube 28, 29 or 31 has been delayed. These echo pulse delays are provided by the delay circuits 40, 45 and 50.

Similarly, when beacon pulses are supplied through one of the switches 19, 21 or 22 to the mixer 27, the echo pulses supplied to the mixer 27 must be delayed the same amount as the beacon pulses. This may be accomplished by means of the switch 84 and delay circuits 55, 60 and 65. It will be apparent that the start of the sawtooth deflection for the cathode ray tube 32 must be delay a corresponding amount. This delay may be obtained by means of a switch 70 and delay networks 75, 80 and 85.

As described in the above-identified Herbst application, when an aircraft ascends or descends into a different altitude layer, the coding delay introduced by the delay network (network 58 in Fig. 4) should be changed. Preferably this is done automatically by a barometric altimeter which is indicated at 91 in Fig. 4. The altimeter shaft 92 assumes an angular position which is a function of altitude. The shaft 92 is mechanically coupled, as indicated by the broken line 93, to a rotatable switch shaft 94 at the delay network 58. Rotation of the shaft 94 switches the desired number of delay line sections into the circuit in steps, there being one switching step for each altitude layer.

As described in the above-identified Jones application and as indicated in Fig. 4, it may be desirable to have an altimeter, such as the altimeter 91, automatically change the tuning of the television receiver 96 on the aircraft in response to said aircraft going to a different altitude layer.

At an aircraft a pilot may be determine which spot in a received picture represents his aircraft by closing momentarily the key 97 (Fig. 4) at the pulse transmitter 57 to increase or interrupt the transmitter power output. This will cause the said spot either to brighten momentarily or to disappear momentarily as the case may be.

If the delay network 56 is employed as shown in Fig. 4, it is advisable to provide at the ground radar receiver a delay correction, as previously described, in the start of the sawtooth wave being applied to the deflecting yoke. Because of this, it may be preferred to omit the delay network 56 and substitute other means for minimizing the tendency of the beacon to "sing." For example, suitable means may be provided for blocking the receiver 54 immediately after the reception of a pulse and to unblock it before the next pulse is received.

While the invention has been described with particular reference to a system employing coding for altitude layer identification, it may be used for other purposes. For example, the invention may be applied to a block system for traffic control of either ships or aircraft wherein different transponder codes are assigned to craft at different distances, respectively, from the ground search radar. Also, it will be apparent that for some applications of the invention the television equipment may be omitted since an operator at the ground station may give instructions to the craft by means of the usual radio communication equipment.

I claim as my invention:

1. A search radar station comprising a pulse transmitter for transmitting radio pulses on a certain carrier frequency to all aircraft within the service area of said station including aircraft equipped with beacons for transmitting pulse signals on a different frequency in response to transmission thereto by said search station, said search station further comprising a beacon pulse receiver tuned to said different carrier frequency for receiving the beacon pulses produced in response to transmission by said pulse transmitter, an echo pulse receiver tuned to said certain carrier frequency for receiving echo pulses reflected from all said aircraft, an indicator connected to receive pulses from said echo receiver, and means responsive to a beacon pulse to disable the connection from said echo receiver to said indicator for the duration of the beacon pulse.

2. A search radar station comprising a pulse transmitter for transmitting radio pulses on a certain carrier frequency to all aircraft within the service area of said station including aircraft equipped with beacons for transmitting pulse signals on a different frequency in response to transmission thereto by said search station, said search station further comprising a beacon pulse receiver tuned to said different carrier frequency for receiving the beacon pulses produced in response to transmission by said pulse transmitter, an echo pulse receiver tuned to said certain carrier frequency for receiving echo pulses reflected from all of said aircraft, an indicator, an amplifier circuit connected to supply pulses from said echo receiver to said indicator, and means supplying beacon pulses from said beacon receiver to said amplifier circuit for making it ineffective to pass an echo pulse during the presence of a simultaneously occurring beacon pulse.

3. A search radar station comprising a pulse transmitter for transmitting radio pulses on a certain carrier frequency to all aircraft within the service area of said station including aircraft equipped with beacons for transmitting pulse signals on a different frequency in response to transmission thereto by said search station, said search station further comprising a beacon pulse receiver tuned to said different carrier frequency for receiving pairs of beacon pulses, each pair of pulses being produced by one of said aircraft beacons in response to transmission thereto of a pulse from said pulse transmitter, an echo pulse receiver tuned to said certain carrier frequency for receiving echo pulses reflected from all of said craft, an indicator, an amplifier circuit connected to supply pulses from said echo receiver to said indicator, and means supplying said pairs of beacon pulses from said beacon receiver to said amplifier circuit for making it ineffective to pass an echo pulse during the occurrence of the first pulse of a pair of beacon pulses.

4. In combination, a search radar station for transmitting signals to beacon-equipped craft within the service area of said search station, said beacon-equipped craft each carrying a radar beacon for transmitting coded signals in response to transmission thereto by said search station, means for coding the transmitted beacon signals with a different code assigned to different groups of craft at different locations, respectively, with respect to said search station, said coded signals consisting of groups of time spaced pulses, said search radar station including a beacon pulse receiver tuned to the carrier frequency of said coded signals, separate signal carrying channels for said different locations connected to said beacon pulse receiver, decoding means for each of said channels, a plurality of indicators, means for supplying the pulses appearing at the outputs of said channels, respectively, to said indicators, respectively, an echo pulse receiver which is tuned to a different carrier frequency to receive echo pulses reflected from the surfaces of all craft within said service area, an indicator connected to receive pulses from said echo pulse receiver, and means responsive to a beacon pulse for disabling the connection from said echo receiver to said indicator for the duration of the beacon pulse.

5. In combination, a search radar station for transmitting signals to beacon-equipped craft within the service area of said search station, said beacon-equipped craft each carrying a radar beacon for transmitting coded signals in response to transmission thereto by said search station, means for coding the transmitted beacon signals with a different code assigned to different groups of craft at different locations, respectively, with respect to said search station, said search radar station including a beacon pulse receiver tuned to the carrier frequency of said coded signals, separate signal carrying channels for said different locations connected to said beacon pulse receiver, decoding means for each of said channels, a plurality of indicators, means for supplying the information appearing at the outputs of said channels, respectively, to said indicators, respectively, an echo pulse receiver which is tuned to a different carrier frequency to receive echo pulses reflected from the surfaces of all craft within said service area, an indicator connected to receive pulses from said echo pulse receiver, and means responsive to a beacon pulse for disabling the connection from said echo receiver to said indicator for the duration of the beacon pulse.

6. In combination, a search radar station for transmitting signals to beacon-equipped craft within the service area of said search station, said beacon-equipped craft each carrying a radar beacon for transmitting coded signals in response to transmission thereto by said search station, means for coding the transmitted beacon signals with a different code assigned to different groups of craft at different locations, respectively, with respect to said search station, said search radar station including a beacon pulse receiver tuned to the carrier frequency of said coded signals, separate signal carrying channels for said different locations connected to said beacon pulse receiver, decoding means for each of said channels, a plurality of indicators, means for supplying the information appearing at the outputs of said channels, respectively, to said indicators, respectively, an echo pulse receiver which is tuned to a different carrier frequency to receive echo pulses reflected from the surfaces of all craft within said service area, an indicator, an amplifier circuit connected to supply pulses from said echo pulse receiver to said indicator, means supplying beacon pulses from said beacon pulse receiver to said amplifier circuit for making it ineffective to pass an echo pulse during the presence of a simultaneously occurring beacon pulse, and means comprising switching circuits for mixing the echo pulses appearing at the output of said amplifier circuit with selected beacon pulses and for supplying them to selected indicators.

IRVING WOLFF.

REFERENCES CITED

The following references are of record in the file of this patent:

UNITED STATES PATENTS

| Number | Name | Date |
| --- | --- | --- |
| 2,132,599 | Baumann | Oct. 11, 1938 |
| 2,134,716 | Gunn | Nov. 1, 1938 |
| 2,321,698 | Nolde | June 15, 1943 |
| 2,405,238 | Seeley | Aug. 6, 1946 |